June 6, 1933.  R. O. DISNEY  1,913,048
METHOD OF AND MEANS FOR SCORING MOTION PICTURES
Filed Oct. 16, 1928
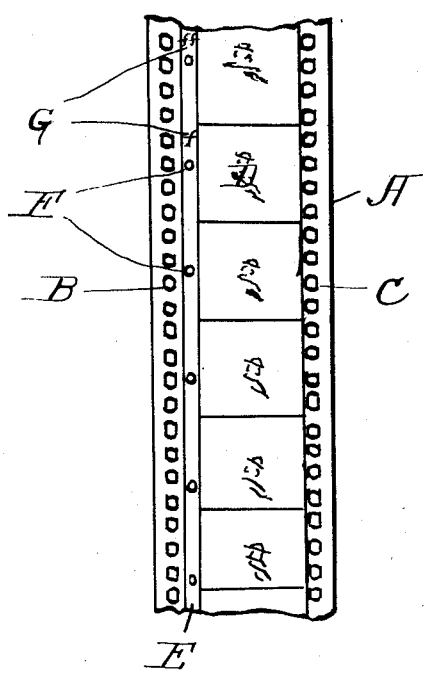
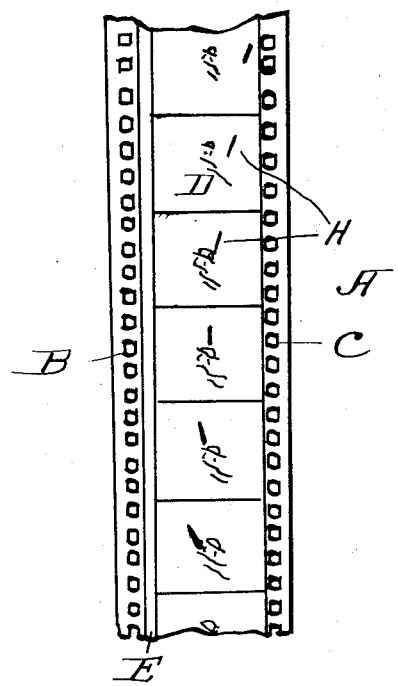
INVENTOR.
Roy O. Disney,
BY Bradbury & Caswell
ATTORNEYS.

Patented June 6, 1933

1,913,048

UNITED STATES PATENT OFFICE

ROY O. DISNEY, OF HOLLYWOOD, CALIFORNIA

METHOD OF AND MEANS FOR SCORING MOTION PICTURES

Application filed October 16, 1928. Serial No. 312,783.

My invention relates to an improved method of and means for accurately combining sound with motion pictures. It has been found in practice difficult to synchronize sound and motion in pictures. The usual method has been to project the picture on a screen and produce the sound in the correct tempo, the synchronizer being the leader of an orchestra or director of any sound upon whose careful eye and ear the accuracy depends. My improved method and means tend to eliminate inaccuracy in scoring sound upon motion pictures.

In illustrating my invention, I have applied it to a cartoon picture but it will be understood that it is equally applicable to all types of motion pictures. In practice a negative is made of the picture with the sound track left blank. Next a corresponding strip of film is used in the sound track of which is recorded the beat and symbols of expression, and sound changes necessitated by the action of the picture. This recording is made by hand taking into consideration the action of the picture and the speed at which the film travels. The beat may be indicated by the vertical movement of a ball and the abbreviations and symbols of sound expression are inscribed in the sound track. Substantially the same results can be obtained by inscribing the desired record on paper and photographing it on the duplicate film which becomes the "score film". The score film therefore consists of a continuous motion picture film, successive frame lengths thereof bearing a ball or other mark at different distances from the frame lines of the film, the degree of magnitude of the variations in distance from the frame lines of the film varying with the tempo of the action with which the sound record is to be synchronized. If desired the "score film" may be made with the waving of a baton or movement of some object in the picture frame rather than in the sound track. Color means may be employed to mark change in action, special happenings or effects. Next the picture negative and the "score negative" are super-imposed and a positive print is made which is a "compositive film". When it is desired to combine the sound with the picture the compositive film is projected onto a screen and the mechanical direction as pictured makes it possible for perfect synchronization of desired sounds whether mechanical, musical or vocal. These noises are recorded on the sound track of the "sound negative". Combining the picture negative and the sound negative produces a finished film. In other words, a score film is made in accordance with this invention, the score film carrying a visual record of the tempo of the action depicted in a motion picture film or to be depicted in a motion picture film. Such a score film is then projected so as to render the ball or other mark visible to the musicians who are to produce the sound negative. The motion of the ball or other mark (relative to the frame lines of the picture area) visually imparts to the musicians the required tempo. If, for example, a vertically movable ball or mark was shown on the score film, the tempo that the musicians utilize in playing is governed by the rapidity or frequency of the rise and fall of the ball which they observe in the projected image. As the motion which the musicians observe is silent, the sound record made by collecting and recording the sounds produced by the musicians, is free from extraneous sounds such as, for example, the ticking of a metronome. Furthermore, the preparation of the score film permits the tempo to be varied with the action whereas variations in tempo can not be made when a metronome is used.

The accompanying drawing forms part of this specification. In this drawing Fig. 1 is a plan of a fragment of the "score film" and Fig. 2 is another plan of the "score film" showing an alternative construction. In the drawing A indicates a fragment of motion picture film having the usual series of feed perforations B and C near its opposite edges, and picture frames D. E indicates the usual longitudinal sound track. The symbol such as a ball or dot F is shown recorded keeping time in the sound track to indicate rhythm. When desired the ball or dot may be colored to represent the interpretation of sound. By coloring "red" for illustrating, it may be used to indicate change of time and when colored "green" it may be used to indicate special happenings or effects. Musical letters and symbols G also recorded in the sound track may be used to indicate pitch and intensity.

In the alternative construction shown in Fig. 2, the score film A is made with the baton H keeping time to synchronize with the picture. The baton is shown swung across the picture frame instead of recording the vertical movement of the ball or other object in the sound track as illustrated in Fig. 1.

After the "score film" is prepared and used in the manner above stated, the "composite film" is used to aid mechanical direction of sound in substantially perfect synchronism. The above method and means are applicable for use in applying sound to any pictures already made.

In accordance with the patent statutes, I have described the principles of operation of my invention together with the method and construction which I consider to represent the best embodiment thereof but I desire to have it understood that the method and construction shown are only illustrative and that the invention can be carried out by other means and applied to uses other than those above set forth within the scope of the following claims.

Having described my invention, what I claim as new and desire to secure by Letters Patent is:

1. The method of combining sound with motion pictures, which consists, first, of producing a motion picture negative, second, of producing a score negative for directing sound to be synchronized with the picture, third, of producing a composite film from said score and picture negative, fourth, of producing a sound negative in synchronism with the score indicated by the said composite film, and finally, of producing a finished film from the combined picture and sound negatives.

2. In a method of producing sound recordings synchronized with motion pictures representing scenes and action, the steps of forming a motion picture film representing scenes and action, producing a strip film bearing a mark in successive frame lengths of the film, the distance of the mark from the frame lines of the strip film varying in successive frames, the degree and magnitude of the variations in distance varying with the tempo of action in the separate picture film with which the sound record is to be synchronized, then projecting the strip film with said mark thereon so as to render the same visible to musicians and producing a continuous sound record of music played by musicians in accordance with the tempo of the moving mark observed by them.

3. In a method of producing sound recordings synchronized with motion pictures representing scenes and action, the steps of forming a motion picture film representing scenes and action, producing a blank strip film bearing a mark in successive frame lengths of the film, the distance of the mark from the frame lines of the strip film varying in successive frames, the degree and magnitude of the variations in distance varying with the tempo of action represented in the separate picture film with which the sound record is to be synchronized, then projecting the strip film with said mark thereon so as to render the same visible to musicians and producing a continuous sound record of music played by musicians in accordance with the tempo of the moving mark observed by them, and finally combining the continuous sound record thus produced with the motion picture film bearing scenes and action so as to form a composite film bearing a continuous sound record synchronized with the scenes and action.

In testimony whereof, I have signed my name to this specification.

ROY O. DISNEY.